(12) United States Patent
Chen et al.

(10) Patent No.: US 8,541,110 B2
(45) Date of Patent: Sep. 24, 2013

(54) RESISTANCE SPOT WELDING MANUFACTURE AND METHOD OF FORMING SAME

(75) Inventors: Chih-Chang Chen, Rochester Hills, MI (US); Michael J. Bland, Clarkston, MI (US); Daniel C. Hutchinson, Goodrich, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 13/009,134

(22) Filed: Jan. 19, 2011

(65) Prior Publication Data

US 2012/0183800 A1 Jul. 19, 2012

(51) Int. Cl.
*B32B 15/01* (2006.01)
*B32B 3/30* (2006.01)

(52) U.S. Cl.
USPC ............................ 428/573; 428/594; 428/683

(58) Field of Classification Search
None
See application file for complete search history.

(56) References Cited

U.S. PATENT DOCUMENTS

| | | | | |
|---|---|---|---|---|
| 2,041,519 A | * | 5/1936 | Altgelt | 428/683 |
| 3,179,504 A | * | 4/1965 | Bothwell | 428/649 |
| 5,055,362 A | * | 10/1991 | McCormick et al. | 428/683 |
| 5,783,794 A | * | 7/1998 | Oikawa et al. | 219/118 |
| 6,689,982 B2 | | 2/2004 | Gabbianelli et al. | |

FOREIGN PATENT DOCUMENTS

DE 69419501 T2 11/1999

OTHER PUBLICATIONS

DE Office Action dated Mar. 19, 2013 for corresponding DE Application 102012000692.6 filed Jan. 16, 2012.

* cited by examiner

*Primary Examiner* — David Sample
*Assistant Examiner* — Adam Krupicka
(74) *Attorney, Agent, or Firm* — Quinn Law Group, PLLC

(57) ABSTRACT

A resistance spot welding manufacture includes a first metal layer having a first thickness, a second metal layer having a faying surface defining an embossed region, wherein the second metal layer has a second thickness that is less than the first thickness so that a ratio of the first thickness to the second thickness is greater than about 2:1, a third metal layer sandwiched between the first metal layer and the embossed region, wherein the third metal layer has a third thickness that is greater than the second thickness, and a weld joint penetrating each of the first metal layer, the third metal layer, and the faying surface at the embossed region to thereby join each of the first metal layer and the second metal layer to the third metal layer. A method of forming a resistance spot welding manufacture is also disclosed.

11 Claims, 2 Drawing Sheets

RESISTANCE SPOT WELDING MANUFACTURE AND METHOD OF FORMING SAME

TECHNICAL FIELD

The present disclosure generally relates to a resistance spot welding manufacture, and more specifically, to a resistance spot welding manufacture including metal layers joined by a weld joint.

BACKGROUND

Resistance spot welding may be used to join metal layers. In general, resistance welding is a joining process in which metal may coalesce at faying interfaces between the metal layers via resistance heating from the passage of electric current under applied force.

In particular, resistance spot welding may be used to join three metal layers so that a middle metal layer is sandwiched between two outer metal layers. For such workpieces, certain industrial welding specifications often require that a thickness ratio between the two outer metal layers should not be more than 1:2, and that a thickness ratio between the middle metal layer and any of the two outer metal layers should not be more than 1:3. Uniform heat distribution between each faying interface generally enhances weld quality and strength for such workpieces.

SUMMARY

A resistance spot welding manufacture includes a first metal layer having a first thickness and a second metal layer having a faying surface defining an embossed region, wherein the second metal layer has a second thickness that is less than the first thickness so that a ratio of the first thickness to the second thickness is greater than about 2:1. The resistance spot welding manufacture also includes a third metal layer sandwiched between the first metal layer and the embossed region, wherein the third metal layer has a third thickness that is greater than the second thickness. Further, the resistance spot welding manufacture includes a weld joint penetrating each of the first metal layer, the third metal layer, and the faying surface at the embossed region to thereby join each of the first metal layer and the second metal layer to the third metal layer.

In one variation, the second metal layer has a second thickness that is less than the first thickness, and a ratio of the third thickness to at least one of the first thickness and the second thickness is greater than about 3:1.

A method of forming a resistance spot welding manufacture includes sandwiching a third metal layer between each of a first metal layer and a second metal layer to thereby form a workpiece. The second metal layer has a faying surface defining an embossed region and disposed adjacent the third metal layer. Further, the first metal layer has a first thickness, the third metal layer has a third thickness, and the second metal layer has a second thickness that is less than each of the first thickness and the third thickness so that a ratio of the first thickness to the second thickness is greater than about 2:1. The method also includes positioning the workpiece between each of a first electrode and a second electrode so that the workpiece is disposed in electrically-conductive relationship with each of the first electrode and the second electrode. Further, the method includes applying an electrical current through the first electrode to concurrently melt each of the first metal layer, the third metal layer, and the faying surface at the embossed region to join each of the first metal layer and the second metal layer to the third metal layer and thereby form the resistance spot welding manufacture.

The resistance spot welding manufacture and method allow for joining of thick and thin metal layers having different thicknesses. For example, the method joins thick-thick-thin metal layer combinations to form the resistance spot welding manufacture having acceptable weld strength and performance. In particular, for the method, the embossed region optimizes resistance heating at the faying surface and therefore generates sufficient heat for the weld joint to penetrate the faying surface of the second metal layer, i.e., the thin metal layer. The method enables resistance spot welding of challenging metal layer combinations such as workpieces having a ratio of the first thickness to the second thickness of greater than about 2:1 and/or a ratio of the third thickness to at least one of the first thickness and the second thickness of greater than about 3:1. Further, the method enables concurrent resistance spot welding of each of the first metal layer, the second metal layer, and the third metal layer, without, for example, employing dual force welding operations, electrodes having differing size or shapes, and/or subsequent resistance spot welding of the second metal layer to a workpiece including a previously-joined first metal layer and third metal layer. Moreover, the method allows for resistance spot welding of resistance spot welding manufactures including bare and zinc coated metal layers.

The above features and advantages and other features and advantages of the present disclosure are readily apparent from the following detailed description of the best modes for carrying out the disclosure when taken in connection with the accompanying drawings.

DETAILED DESCRIPTION

Figure 1:
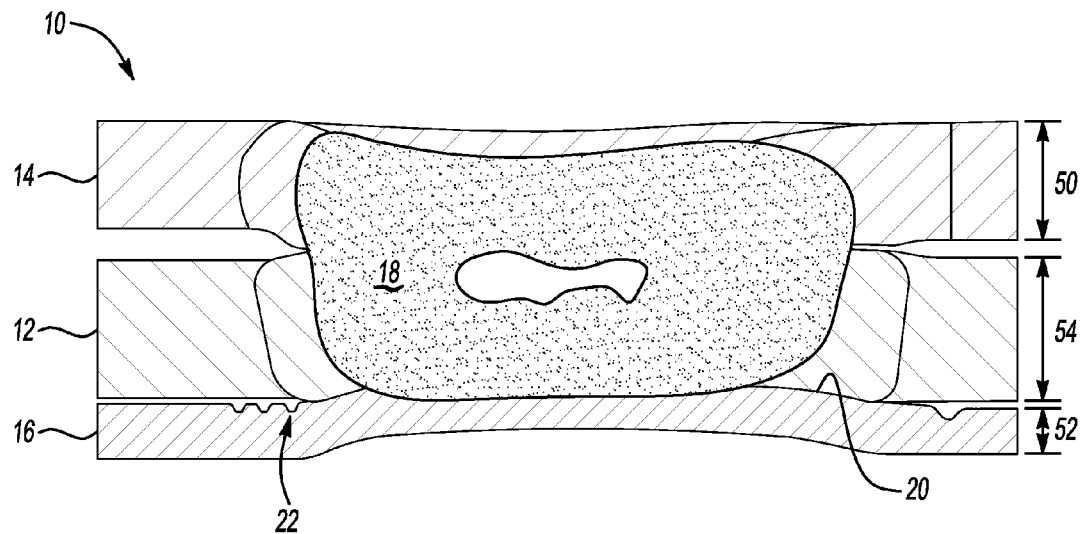
FIG. 1 is a schematic cross-sectional view of a resistance spot welding manufacture including a third metal layer sandwiched between and joined to a first metal layer and a second metal layer by a weld joint.

Referring to the Figures, wherein like reference numerals refer to like elements, a resistance spot welding manufacture is shown generally at 10 in FIG. 1. As set forth in more detail below, the resistance spot welding manufacture 10 may be useful for applications requiring a third metal layer 12 sandwiched between and joined to a first metal layer 14 and a second metal layer 16 by a weld joint 18. For example, the resistance spot welding manufacture 10 may be useful for automotive applications requiring welded components. However, the resistance spot welding manufacture 10 may also be useful for non-automotive applications, such as, but not limited to, aviation, rail, and construction applications.

As shown in FIG. 1, the resistance spot welding manufacture 10 includes the first metal layer 14. The first metal layer 14 may be formed from any metal suitable for a desired application of the resistance spot welding manufacture 10. For example, the first metal layer 14 may be formed from steel, such as, but not limited to, high-strength steel.

Referring again to FIG. 1, the first metal layer 14 has a first thickness 50. Although the first thickness 50 of the first metal layer 14 is also dependent upon the desired application of the resistance spot welding manufacture 10, as a non-limiting example, the first thickness 50 of the first metal layer 14 may be from about 1.5 mm to about 3 mm for automotive applications.

As further shown in FIG. 1, the resistance spot welding manufacture 10 also includes the second metal layer 16. The second metal layer 16 may also be formed from any suitable metal according to the desired application of the resistance spot welding manufacture 10. As a non-limiting example, the second metal layer 16 may be formed from galvanized low- or ultra-low-carbon steel.

Referring again to FIG. 1, the second metal layer 16 has a second thickness 52 that is less than the first thickness 50 so that a ratio of the first thickness 50 to the second thickness 52 is greater than about 2:1. For automotive applications in particular, the second thickness 52 may be from about 0.5 mm to about 1 mm. Therefore, the second metal layer 16 may be characterized as a "thin" layer as compared to the first metal layer 14, which may be characterized as a "thick" layer.

Figure 3:
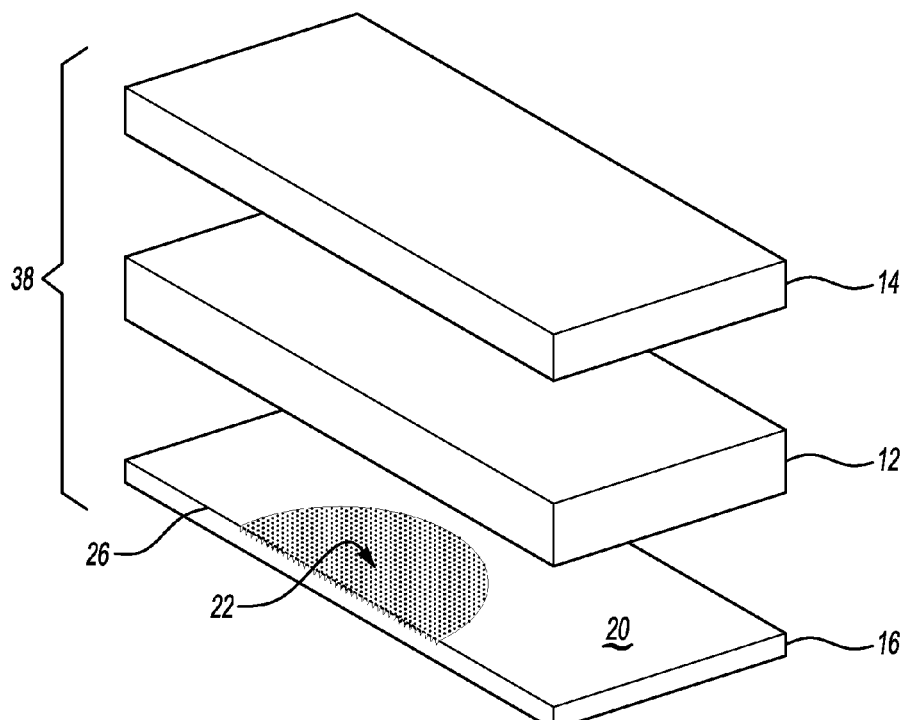
FIG. 3 is a schematic perspective exploded view of the workpiece of FIG. 2, including the second metal layer of the resistance spot welding manufacture of FIG. 1 having a faying surface defining an embossed region.

As best shown in FIG. 3, the second metal layer 16 has a faying surface 20 defining an embossed region 22. The faying surface 20 may be interfaced with another surface and melt when exposed to resistance heating during resistance spot welding, as set forth in more detail below. And, the embossed region 22 is configured to increase resistance heating at the faying surface 20 during resistance spot welding at a specific location of the weld joint 18 (FIG. 1), as also set forth in more detail below.

As used herein, the terminology "embossed region 22" refers generally to an area of increased roughness on the faying surface 20. That is, the embossed region 22 may include peaks and/or valleys carved or molded in relief with respect to the faying surface 20. For example, referring to FIGS. 2 and 3, the embossed region 22 may define a plurality of V-shaped notches 24 (FIG. 2) in the faying surface 20. In another variation, the embossed region 22 may define grooves or scratches (not shown) in the faying surface 20. In addition, the embossed region 22 may have any shape. For example, as shown in FIG. 3, the embossed region 22 may be semi-circular and may align with an external edge 26 of the faying surface 20. However, the embossed region 22 may also have for example, a circular shape (FIG. 5), an irregular shape, a polygon shape, a stripe shape, and combinations thereof (not shown). Additionally, referring also to FIG. 5, the faying surface 20 may define a plurality of embossed regions 22 each spaced apart from one another.

Therefore, referring again to FIG. 3, the embossed region 22 may be formed via any suitable technique. For example, a die (not shown) having a knurled surface may be pressed into the faying surface 20 to thereby define the embossed region 22. Alternatively or additionally, the faying surface 20 may be scratched or otherwise roughened to define peaks and valleys (FIG. 2) of the embossed region 22.

Figure 4:
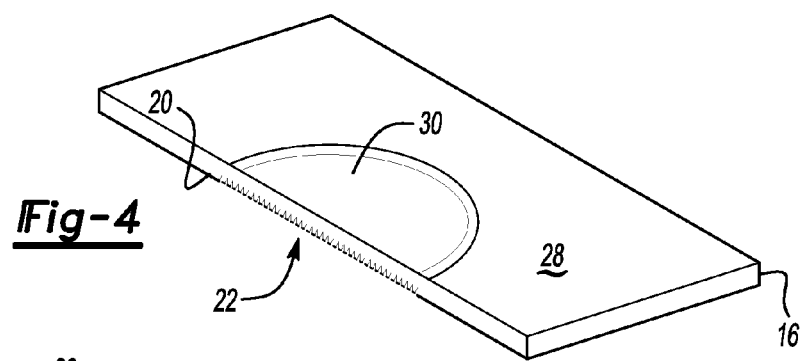
FIG. 4 is a schematic perspective view of a backside second surface of the second metal layer of FIGS. 1 and 3.

Referring to FIG. 4, the second metal layer 16 may have a backside second surface 28 spaced opposite the faying surface 20 and defining an imprint 30 aligned with the embossed region 22. For example, when the embossed region 22 is formed by a die (not shown), the imprint 30 may be formed as one half of the die mates with a second half of the die to form the embossed region 22. Therefore, the imprint 30 may have a shape corresponding to the shape of the embossed region 22. For resistance spot welding applications that utilize manual or robotic welding devices (not shown), the imprint 30 may be useful as a reference point for locating weld positions and/or training robotic welding devices.

Referring again to FIG. 1, the resistance spot welding manufacture 10 also includes the third metal layer 12 sandwiched between the first metal layer 14 and the embossed region 22. That is, the third metal layer 12 may be disposed adjacent and in contact with each of the first metal layer 14 and the embossed region 22 so as to be disposed between each of the first metal layer 14 and the second metal layer 16. As shown in FIG. 3, the faying surface 20 defining the embossed region 22 may face the third metal layer 12 when the third metal layer 12 is sandwiched between the first metal layer 14 and the second metal layer 16.

Figure 2:
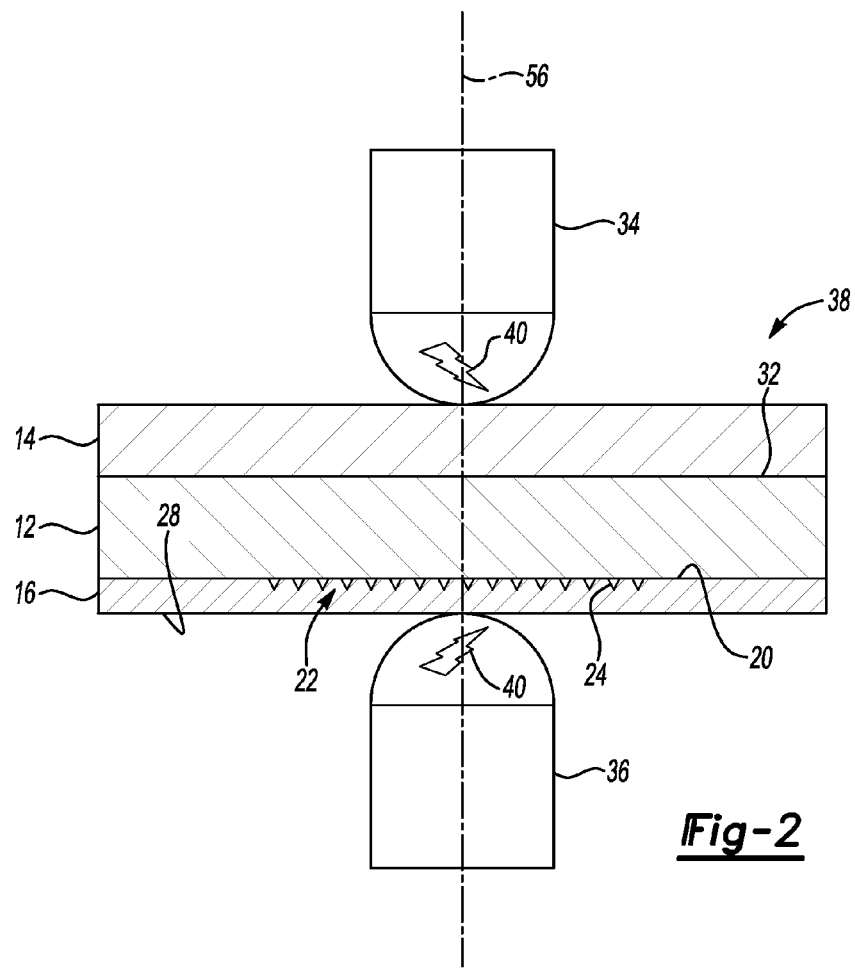
FIG. 2 is a schematic cross-sectional view of a workpiece disposed between a first electrode and a second electrode in preparation for forming the resistance spot welding manufacture of FIG. 1.

The third metal layer 12 may also be formed from any suitable metal according to the desired application of the resistance spot welding manufacture 10. For example, the third metal layer 12 may be formed from steel, such as, but not limited to, high strength steel. Further, the third metal layer 12 has a third thickness 54 that is greater than the second thickness 52. Depending upon the desired application of the resistance spot welding manufacture 10, the third thickness 54 may be from about 1.5 mm to about 3 mm for automotive applications. In addition, in one variation, the third thickness 54 may be greater than the first thickness 50. Therefore, the third metal layer 12 may be characterized as a "thick" layer as compared to the second metal layer 16, which may be characterized as a "thin" layer. As such, as shown in FIG. 2, the third metal layer 12 is sandwiched between the first metal layer 14 and the second metal layer 16 to form a "thick-thick-thin" sequence. Therefore, the resistance spot welding manufacture 10 may be useful for applications such as a three-layer metal combination including a thick high-strength steel B-pillar (i.e., the first metal layer 14), a thick high-strength steel reinforcement (i.e., the third metal layer 12), and a thin ultra-low-carbon steel vehicle body side (i.e., the second metal layer 16).

Referring to FIG. 1, a ratio of the first thickness 50 to the second thickness 52 is greater than about 2:1. For example, the first metal layer 14 may have a first thickness 50 of about 1.6 mm, the third metal layer 12 may have a third thickness 54 of about 1.8 mm, and the second metal layer 16 may have a second thickness 52 of about 0.7 mm.

In another variation, a ratio of the third thickness 54 to at least one of the first thickness 50 and the second thickness 52 is greater than about 3:1. For example, the first metal layer 14 may have a first thickness 50 of about 3.5 mm, the third metal layer 12 may have a third thickness 54 of about 1.6 mm, and the second metal layer 16 may have a second thickness 52 of about 0.4 mm. For this variation, the ratio of the first thickness 50 to the second thickness 52 may also be greater than about 2:1.

As set forth above, each of the first metal layer 14, the second metal layer 16, and the third metal layer 12 may be formed from steel. The steel may include carbon and other alloying elements. Further, such alloying elements, especially carbon, may contribute to the strength of the steel. Unlike the first metal layer 14 and the third metal layer 12, which may be characterized as "thick" as set forth above, formability may be more important than strength for the second metal layer 16, which may be characterized as "thin". Therefore, the amount of carbon and/or other alloying elements present in the second metal layer 16 may be less than an amount of carbon and/or other alloying elements present in either of the first metal layer 14 and the third metal layer 12. Consequently, the second metal layer 16 may have a lower melting point temperature as compared to the respective melting point temperatures of either of the first metal layer 14 and the third metal layer 12. In addition, as set forth above, the second metal layer 16 may be, for example, a vehicle body side (not shown), may require comparatively more corrosion-resistance, and may include a zinc coating for protection. The zinc coating may also further reduce the resistance heating generated at the faying surface 20 between the second metal layer 16 and the third metal layer 12.

Referring again to FIG. 1, the resistance spot welding manufacture 10 further includes the weld joint 18 penetrating each of the first metal layer 14, the third metal layer 12, and the faying surface 20 at the embossed region 22 (FIG. 2) to thereby join each of the first metal layer 14 and the second metal layer 16 to the third metal layer 12. By way of non-limiting examples, the weld joint 18 may be formed via any suitable resistance spot welding technique. By way of general explanation and described with reference to FIG. 2, resistance spot welding may be carried out via a resistance spot welding device (partially shown) that may include a supply of electrical current (not shown) and two electrodes 34, 36 configured for clamping together each of the first metal layer 14, the third metal layer 12, and the second metal layer 16, as set forth in more detail below. Without intending to be limited by theory, the embossed region 22 may increase the resistance heating of the faying surface 20 during resistance spot welding and promote formation of the weld joint 18 (FIG. 1) at the location of the embossed region 22 on the faying surface 20.

Figure 5:
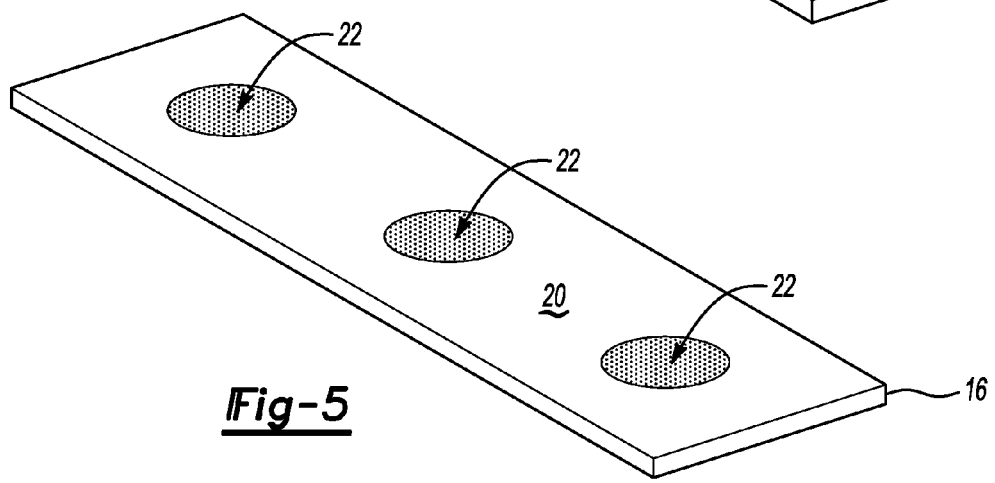
FIG. 5 is a schematic perspective view of another variation of the second metal layer of FIGS. 1 and 3 having a faying surface defining a plurality of embossed regions.

In addition, for the variation of the faying surface 20 defining the plurality of embossed regions 22 as shown in FIG. 5, the resistance spot welding manufacture 10 may include a plurality of weld joints 18 (not shown). That is, since each embossed region 22 may increase the resistance heating of the faying surface 20 during resistance spot welding, a weld joint 18 may form at the location of each embossed region 22 to thereby join the first metal layer 14, the third metal layer 12, and the second metal layer 16 to form the resistance spot welding manufacture 10.

A method of forming a resistance spot welding manufacture 10 is now described with reference to FIGS. 1-5. Referring specifically to FIG. 2, the method includes sandwiching the third metal layer 12 between each of the first metal layer 14 and the second metal layer 16 to thereby form a workpiece 38. That is, sandwiching may dispose the third metal layer 12 adjacent and in contact with each of the first metal layer 14 and the faying surface 20. As set forth above and described with reference to FIG. 2, the second metal layer 16 has the faying surface 20 defining the embossed region 22 and disposed adjacent the third metal layer 12. Further, the first metal layer 14 has the first thickness 50, the third metal layer 12 has the third thickness 54, and the second metal layer 16 has the second thickness 52 that is less than each of the first thickness 50 and the third thickness 54 so that a ratio of the first thickness 50 to the second thickness 52 is greater than about 2:1. A ratio of the third thickness 54 to at least one of the first thickness 50 and the second thickness 52 may also be greater than about 3:1.

Referring again to FIG. 2, the method further includes positioning the workpiece 38 between each of a first electrode 34 and a second electrode 36 so that the workpiece 38 is disposed in electrically-conductive relationship with each of the first electrode 34 and the second electrode 36. That is, the second electrode 36 may be spaced apart from the first electrode 34 so as to allow placement of the workpiece 38 between each of the first electrode 34 and the second electrode 36 so that the first electrode 34 may conduct electricity to the workpiece 38. For example, positioning may dispose the workpiece 38 adjacent and in contact with each of the first electrode 34 and the second electrode 36. More specifically, the first metal layer 14 may be disposed adjacent the first electrode 34 and the second metal layer 16, e.g., the second surface 28 of the second metal layer 16, may be disposed adjacent and in contact with the second electrode 36.

Further, referring to FIG. 2, positioning the workpiece 38 may align the workpiece 38 between each of the first electrode 34 and the second electrode 36 along an axis 56 perpendicular to the faying surface 20 through the embossed region 22. Therefore, positioning may align the first electrode 34 and the second electrode 36 with the embossed region 22.

Although not shown in FIG. 2, either or both of the first electrode 34 and the second electrode 36 may also be fixed or moveable with respect to the workpiece 38 and may be connected to an arm (not shown) or other element configured for positioning the workpiece 38 between each of the first electrode 34 and the second electrode 36. For example, either or both of the first electrode 34 and the second electrode 36 may be a servomotor-driven moveable electrode 34, 36.

Referring again to FIG. 2, the method also includes applying an electrical current (denoted by symbol 40 in FIG. 2) through the first electrode 34 to concurrently melt each of the first metal layer 14, the third metal layer 12, and the faying surface 20 at the embossed region 22 to join each of the first metal layer 14 and the second metal layer 16 to the third metal layer 12 and thereby form the resistance spot welding manufacture 10. That is, the electrical current 40 may be supplied from a source of electrical energy (not shown) to the first electrode 34, through the workpiece 38, and through the second electrode 36 to complete an electrical circuit. It is to be appreciated that the electrical current 40 may additionally or alternatively be supplied to the second electrode 36, through the workpiece 38, and through the first electrode 34 to complete the electrical circuit. As the electrical current 40 is applied, heat from resistance to the electrical current 40 builds up at both an interface 32 between the first metal layer 14 and the third metal layer 12, and at the embossed region 22 of the faying surface 20 between the third metal layer 12 and the second metal layer 16.

Without intending to be limited by theory and described generally with reference to FIG. 2, the embossed region 22 increases resistivity, and therefore resistance heating, to promote desired penetration of the weld joint 18 (FIG. 1) into the faying surface 20. That is, since the second metal layer 16 is thinner, and may have a lower carbon content and corresponding higher melting point temperature than either of the first metal layer 14 and the third metal layer 12, penetration of the weld joint 18 (FIG. 1) into the second metal layer 16 is maximized by the embossed region 22. Stated differently, without the embossed region 22 of the faying surface 20, rapid cooling may occur during resistance spot welding at the second metal layer 16 since the thermal conductivity of the second metal layer 16 is relatively higher than the thermal conductivity of either of the first metal layer 14 and the third metal layer 12. Rapid cooling may also occur during resistance spot welding without the embossed region 22 of the faying surface 20 since the second electrode 36 is comparatively closer to the faying surface 20 than the first electrode 34 is to the interface 32 between the first metal layer 14 and the third metal layer 12.

In contrast, since each of the first metal layer 14 and the third metal layer 12 is thicker than the second metal layer 16, and may have a higher carbon content and corresponding lower melting point temperature than the second metal layer 16, each of the first metal layer 14 and the third metal layer 12 may exhibit relatively higher resistance to the electrical current 40. Such relatively higher resistance to the electrical current 40 generates higher resistance heating during resistance spot welding at the interface 32 as compared to the faying surface 20. The embossed region 22 compensates for such differences in resistance heating at the interface 32 and the faying surface 20. That is, the embossed region 22 minimizes skewed formation of the weld joint 18 towards the first metal layer 14 and the third metal layer 12, and instead promotes penetration of the weld joint 18 into the faying surface 20 by increasing resistance heating at the faying surface 20. Consequently, a desired joining, i.e., fusion, of each of the first metal layer 14 and the second metal layer 16 to the third metal layer 12 may be achieved via the strong weld joint 18.

With continued reference to FIGS. 2 and 3, since the embossed region 22 is rougher than the surrounding faying surface 20, the embossed region 22 provides contact points, e.g., peaks, with the third metal layer 12. The comparatively rougher embossed region 22 therefore resists flow of the electrical current 40, i.e., increases the resistivity, as compared to a resistivity of the smooth-to-smooth interface 32 between the first metal layer 14 and the third metal layer 12. Such increased resistivity increases heat at the embossed region 22 during resistance spot welding and thereby promotes formation of the weld joint 18 to include penetration into the faying surface 20 of the second metal layer 16.

Therefore, the resistance spot welding manufacture 10 and method allow for joining of thick and thin metal layers 12, 14, 16 having different thicknesses 50, 52, 54. For example, the method joins thick-thick-thin metal layer combinations to form the resistance spot welding manufacture 10 having excellent weld strength and performance. In particular, for the method, the embossed region 22 of the faying surface 20 optimizes resistance heating at the faying surface 20 and therefore generates sufficient heat for the weld joint 18 to penetrate the faying surface 20 of the second metal layer 16, i.e., the thin metal layer 16. The method enables resistance spot welding of challenging metal layer combinations such as workpieces having a ratio of the first thickness 50 to the second thickness 52 of greater than about 2:1 and/or a ratio of the third thickness 54 to at least one of the first thickness 50 and the second thickness 52 of greater than about 3:1. Further, the method enables concurrent resistance spot welding of each of the first metal layer 14, the second metal layer 16, and the third metal layer 12, without, for example, employing dual force welding operations, electrodes having differing sizes or shapes, and/or subsequent welding of the second metal layer 16 to a workpiece including a previously-joined first metal layer 14 and third metal layer 12. Moreover, the method allows for resistance spot welding of resistance spot welding manufactures 10 including bare and zinc coated metal layers 12, 14, 16.

While the best modes for carrying out the disclosure have been described in detail, those familiar with the art to which this disclosure relates will recognize various alternative designs and embodiments for practicing the disclosure within the scope of the appended claims.

The invention claimed is:

1. A resistance spot welding manufacture comprising:
a first metal layer having a first thickness;
a second metal layer having a faying surface defining an embossed region, wherein said second metal layer has a second thickness that is less than said first thickness so that a ratio of said first thickness to said second thickness is greater than about 2:1;
a third metal layer sandwiched between said first metal layer and said embossed region such that said third metal layer is disposed adjacent to and in contact with each of said first metal layer and said second metal layer, wherein said third metal layer has a third thickness that is greater than said first thickness and is greater than said second thickness; and
a weld joint penetrating each of said first metal layer, said third metal layer, and said faying surface at said embossed region to thereby join each of said first metal layer and said second metal layer to said third metal layer.

2. The resistance spot welding manufacture of claim 1, wherein said second metal layer has a second surface spaced opposite said faying surface and defining an imprint aligned with said embossed region.

3. The resistance spot welding manufacture of claim 1, wherein said embossed region defines a plurality of V-shaped notches in said faying surface.

4. The resistance spot welding manufacture of claim 1, wherein said faying surface defines a plurality of embossed regions each spaced apart from one another.

5. A resistance spot welding manufacture comprising:
a first metal layer having a first thickness;
a second metal layer having a faying surface defining an embossed region, wherein said second metal layer has a second thickness that is less than said first thickness so that a ratio of said first thickness to said second thickness is greater than about 2:1;
a third metal layer sandwiched between said first metal layer and said embossed region such that said third metal layer is disposed adjacent to and in contact with each of said first metal layer and said second metal layer, wherein said third metal layer has a third thickness that is greater than said second thickness;
wherein each of said first metal layer, said second metal layer, and said third metal layer is formed from steel including carbon;
wherein an amount of carbon present in said second metal layer is less than an amount of carbon present in either of said first metal layer and said third metal layer; and
a weld joint penetrating each of said first metal layer, said third metal layer, and said faying surface at said embossed region to thereby join each of said first metal layer and said second metal layer to said third metal layer.

6. The resistance spot welding manufacture of claim 5, wherein at least one of said first metal layer and said second metal layer is uncoated.

7. The resistance spot welding manufacture of claim 5, wherein said second metal layer has a second surface spaced opposite said faying surface and defining an imprint aligned with said embossed region.

8. The resistance spot welding manufacture of claim 5, wherein said embossed region defines a plurality of V-shaped notches in said faying surface.

9. The resistance spot welding manufacture of claim 5, wherein said faying surface defines a plurality of embossed regions each spaced apart from one another.

10. A resistance spot welding manufacture comprising:
a first metal layer having a first thickness;
a second metal layer having a faying surface defining an embossed region, wherein said second metal layer has a second thickness that is less than said first thickness;

a third metal layer sandwiched between said first metal layer and said embossed region such that said third metal layer is disposed adjacent to and in contact with each of said first metal layer and said second metal layer, wherein said third metal layer has a third thickness that is greater than said second thickness; and a weld joint penetrating each of said first metal layer, said third metal layer, and said faying surface at said embossed region to thereby join each of said first metal layer and said second metal layer to said third metal layer;

wherein a ratio of said third thickness to at least one of said first thickness and said second thickness is greater than about 3:1.

11. The resistance spot welding manufacture of claim 10, wherein a ratio of said first thickness to said second thickness is greater than about 2:1.

\* \* \* \* \*